(12) United States Patent
Bunker et al.

(10) Patent No.: US 12,240,066 B2
(45) Date of Patent: Mar. 4, 2025

(54) WELD JOINTS INVOLVING DISSIMILAR METALS AND METHODS FOR FORMING SAME

(71) Applicant: National Oilwell DHT, L.P., Conroe, TX (US)

(72) Inventors: William Randal Bunker, Conroe, TX (US); Helna George, Houston, TX (US); Rajagopala N. Pillai, Pasadena, TX (US)

(73) Assignee: National Oilwell Varco. L.P., Houston, TX (US)

( * ) Notice: Subject to any disclaimer, the term of this patent is extended or adjusted under 35 U.S.C. 154(b) by 670 days.

(21) Appl. No.: 17/427,568

(22) PCT Filed: Feb. 11, 2020

(86) PCT No.: PCT/US2020/017704
§ 371 (c)(1),
(2) Date: Jul. 30, 2021

(87) PCT Pub. No.: WO2020/172005
PCT Pub. Date: Aug. 27, 2020

(65) Prior Publication Data
US 2022/0143734 A1    May 12, 2022

Related U.S. Application Data

(60) Provisional application No. 62/808,422, filed on Feb. 21, 2019.

(51) Int. Cl.
*B23K 9/23* (2006.01)
*B23K 9/028* (2006.01)
(Continued)

(52) U.S. Cl.
CPC .............. *B23K 9/23* (2013.01); *B23K 9/0282* (2013.01); *C21D 9/50* (2013.01); *B23K 2103/05* (2018.08); *E21B 17/042* (2013.01)

(58) Field of Classification Search
CPC .... B23K 9/23; B23K 9/0282; B23K 2103/05; B23K 9/0026; B23K 9/232; B23K 9/235;
(Continued)

(56) References Cited

U.S. PATENT DOCUMENTS

| 4,273,159 A  | * | 6/1981 | Bolton ................... B23K 9/046 |
|              |   |        | 175/325.1 |
| 4,702,406 A  |   | 10/1987 | Sullivan |
| 2017/0157692 A1 | * | 6/2017 | Kozak et al. ........ B23K 9/0026 |

FOREIGN PATENT DOCUMENTS

| CN | 106536111 | 3/2017 |
| JP | 2017-213588 | 12/2017 |
| WO | 01/63974 | 8/2001 |

OTHER PUBLICATIONS

Monica maria de Abreu Mendonca Schvartzman et al. Stress corrosion cracking of the AISI 316L stainless steel HAZ in a PWR nuclear reactor environment, Welding International, vol. 25, No. 1, Jan. 2011 (Year: 2011).*

(Continued)

*Primary Examiner* — Sally A Merkling
*Assistant Examiner* — Danielle M. Carda
(74) *Attorney, Agent, or Firm* — Conley Rose, P.C.

(57) ABSTRACT

A method of joining a steel first member to a stainless steel second member includes buttering a first joint surface on the first member, the buttering including: preheating the first joint surface; welding a border layer of weld material to the first joint surface; and heat treating the border layer and the first joint surface after welding the border layer. A weld is formed between the first and second members after heat treating the border layer and the first joint surface. The (Continued)

border layer and a second joint surface on the second member are preheated; and a body of weld material is added between the border layer and the second joint surface.

11 Claims, 6 Drawing Sheets

(51) Int. Cl.
    *B23K 103/04*     (2006.01)
    *C21D 9/50*     (2006.01)
    *E21B 17/042*     (2006.01)

(58) Field of Classification Search
    CPC .................. B23K 2103/04; B23K 2103/18; B23K 9/032; C21D 9/50; E21B 17/042; E21B 17/03
    USPC ........................................................ 148/529
    See application file for complete search history.

(56) References Cited

OTHER PUBLICATIONS

Khaled, Preheating, interpass and Post-weld heat treatment requirements for welding low alloy steels, Oct. 22, 2014 (Year: 2014).*
Lucas Milhaupt Principles of Joint Design, 2020 (Year: 2020).*
Extended European Search Report dated Oct. 5, 2022, for Application No. EP20758747.8.
Monica Maria De Abreu Mendonca Schvartzman et al: "Stress corrosion cracking of the AISI 316L stainless steel HAZ in a PWR nuclear reactor environment", Welding International, Taylor & Francis, Abingdon, GB, vol. 25, No. 1, Jan. 1, 2011 (Jan. 1, 2011), pp. 15-23, XP001561191.
Maruyama T: "Arc Welding Technology for Dissimilar Joints", Welding International, Taylor & Francis, Abingdon, GB, vol. 17, No. 4, Jan. 1, 2003 (Jan. 1, 2003), pp. 276-281, XP001161847.
Wang HT et al: "Local mechanical properties of a dissimilar metal welded joint in nuclear powersystems", Materials Science, Elsevier, Amsterdam, NL, vol. 568, Jan. 24, 2013 (Jan. 24, 2013), pp. 108-117, XP028995348.
American Iron and Steel "Welding of Stainless Steels and Other Joining Methods"; 1979 NiDI (47 pages).
Khaled, T "Preheating, Interpass and Post-Weld Heat Treatment Requirements for Welding Low Alloy Steels"; Oct. 22, 2014 (14 pages).
Kobe Steel, Ltd "The ABC's of Arc Welding"; article {online]. May 2, 2018 (2 pages).
Nickel Development Institute "Guidelines for the welded fabrication of nickel-containing stainless steels for corrosion resistant services"; reference book (52 pages), Sep. 2, 2020.
AK Steel, 17-4 PH Stainless Steel, Pamlet, Oct. 26, 2018 (20 pages).
English Abstract of CN106536111 (1), Mar. 3, 2022.
Search Report and Written Opinion for PCT/US20/17704 dated Jun. 15, 2020 (13 pages).

* cited by examiner

FIG. 12

WELD JOINTS INVOLVING DISSIMILAR METALS AND METHODS FOR FORMING SAME

CROSS REFERENCE TO RELATED APPLICATIONS

This application is a 35 U.S.C. § 371 national stage application of PCT/US2020/017704 filed Feb. 11, 2020 and entitled "Weld Joints Involving Dissimilar Metals and Methods for Forming Same", which claims priority to U.S. provisional patent application Ser. No. 62/808,422 filed Feb. 21, 2019, and entitled "Weld Joints Involving Dissimilar Metals and Methods for Forming Same," each of which is hereby incorporated herein by reference in their entirety for all purposes.

STATEMENT REGARDING FEDERALLY SPONSORED RESEARCH OR DEVELOPMENT

Not applicable.

BACKGROUND

Field of the Disclosure

This disclosure relates generally to welding. More particularly, it relates to welded joints between dissimilar metals and methods of forming these joints. Still more particularly, this disclosure relates to welded joints between tubular members that are made of dissimilar metals.

Background to the Disclosure

Threaded tubulars are common in many industrial applications, such as, for example, oil and gas drilling, production, transportation, refining, etc. In oil and gas drilling operations, a drill bit is threadably attached at one end a threaded tubular, and the tubular is rotated (e.g., from the surface, by a mud motor located downhole, etc.) in order to form a borehole. As the bit advances within the formation, additional tubulars (e.g., lengths of pipe threaded at their ends) are threadably attached at the surface, thereby forming a drill string which, in turn, allows the length of the borehole to be extended. Threaded tubulars and other threaded members are found within down tools such as mud motors, thread crossovers, jarring devices, and stabilizers, as examples. Once the borehole reaches a desired length, other threaded tubulars are joined end-to-end and set within the borehole as casing to isolate earthen zones and to provide a flow path for producing hydrocarbons, for example.

Due to the types of metals used in the threaded members, the thread joints between members may be susceptible to galling and stress failures, sometimes necessitating repairs to the tubulars. Joints formed by stainless steel members are among those that are susceptible to these issues. Finding ways to reduce the potential for difficulties and the frequency of repairs for threaded joints would be helpful to the industry.

SUMMARY OF THE DISCLOSURE

Accordingly, disclosed herein are methods of welding and also welded joints that are intended to better resist galling and stress failures, particular suitable for threaded joints in tubular members.

In one embodiment, there is disclosed a method of welding to join a steel first member to a stainless steel second member, the method including buttering a first joint surface on the first member. The buttering comprises: preheating the first joint surface; welding a border layer of weld material to the first joint surface; and heat treating the border layer and the first joint surface after welding the border layer. The welding method further includes forming a weld between the first and second members after heat treating the border layer and the first joint surface. The forming includes preheating the border layer and preheating a second joint surface on the second member; and adding a body of weld material between the border layer and the second joint surface.

In some embodiments, the adding a body of weld material comprises: welding a plurality of passes of weld material between the border layer and the second joint surface; and maintaining an interpass temperature of 177 degrees C. or less while welding the plurality of passes.

In some embodiments, the method further includes maintaining a welding heat input between 15 and 30 KJoule/inch while forming the weld between the first and second members, and in some embodiments, the method further includes preheating the first and second members to 75+/−5 degrees F. prior to forming the weld between the first and second members.

In some embodiments, the first member is a high-strength low alloy steel, and the stainless steel of the second member is a precipitation-hardened (PH) stainless steel.

In some embodiments, wherein both the first and second members are tubular, and the plurality of passes of weld material are annular.

In some embodiments, the first and second members are joined at a threaded joint prior to welding the plurality of passes of weld material, and in some embodiments, the method further includes overlapping the first and second members prior to welding the plurality of passes of weld material.

In some embodiments, forming a weld between the first and second members further includes: establishing a three-sided trough between first and second members; wherein the trough includes the border layer on the first member and the second joint surface on the second member; and wherein welding the plurality of passes of weld material is performed within the trough.

In some embodiments of the method, the first member is tubular having a first weld-participating end and the second member is tubular having a second weld-participating end. A passageway extends through the first and second weld-participating ends, According to this embodiment of the method, the first and second members are aligned along a centerline and the method includes an action selected from the following group of actions: inserting a portion of the first weld-participating end inside a portion of the second weld-participating end; and inserting a portion of the second weld-participating end inside a portion of the first weld-participating end. According to this embodiment, the method further comprises: removing an inner portion of the first weld-participating end or an inner portion of the second weld-participating end to expose the weld to the passageway.

In some embodiments, the method further includes: performing an age hardening process for the weld formed between the first and second members; wherein the age hardening process includes heating the weld to a temperature in the range of 482 to 621 degrees Celsius followed by air-cooling the weld.

Also disclosed herein is a welded joint comprising: a high-strength low alloy steel first member; a stainless steel second member; and a weld formed between the first and second members, the weld comprising: a border layer of weld material welded to the first member, the border layer comprising gama and sigma microstructures; and a body of weld material disposed between the border layer and the second member.

In some embodiments, the first member is tubular and the second member is tubular, and the body of weld material is annular; wherein a heat-affected zone of the first member lacks untempered martensite microstructures. In some embodiments, the first and second members include a threaded joint, and the weld prevents the threaded joint from unscrewing.

In some embodiments, the stainless steel is a precipitation-hardened (PH) stainless steel; and the weld material of the border layer and the weld material of the body both include a super duplex stainless steel. The high-strength low alloy steel may be a 4330V steel; and the PH stainless steel may be selected from among a group that includes stainless steels equivalent to type 15-5, 17-4 and type 13-8 as defined by ASTM A564.

In another disclosed embodiment, a welded joint comprises: a steel first member; a stainless steel second member; and a weld formed between the first and second members. The weld comprises: a border layer of weld material welded to the first member; and a body of weld material disposed between the bordering layer and the second member; wherein the first member lacks untempered martensite in a heat-affected zone that extends from the border layer. The border may comprise gamma and sigma microstructures in some embodiments, and the border layer may be free of ferrite microstructures. In some embodiments of the welded join, the first steel is a high-strength low alloy steel.

BRIEF DESCRIPTION OF THE DRAWINGS

For a detailed description of the disclosed exemplary embodiments, reference will now be made to the accompanying drawings, wherein.

NOTATION AND NOMENCLATURE

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not drawn to-scale. Certain features and components disclosed herein may be shown exaggerated in scale or in somewhat schematic form, and some details of certain elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B." In addition, the word "substantially" means within a range of plus or minus 10%.

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position is made for purpose of clarity, with examples including "top," "bottom," "up," "upper," "upward," "down," "lower," "clockwise," "left," "leftward," "right," and "right-hand." For example, a relative direction or a relative position of an object or feature may pertain to the orientation as shown in a figure or as described. If the object or feature were viewed from another orientation or were implemented in another orientation, it may then be helpful to describe the direction or position using an alternate term.

DETAILED DESCRIPTION OF THE DISCLOSED EXEMPLARY EMBODIMENTS

This disclosure presents welded joints or, simply, welds and methods of creating those welds. The welds include a base or border layer, which will also be called a buttering layer or butter layer, applied to a first member. The welds also include a weld body that is applied in order to weld a second member to the first member. As will be shown, for various embodiments, the weld body extends from the border layer to a surface on the second member. In various embodiments, the first member is formed from steel, which may be a high-strength low alloy steel, and the second member is formed from a stainless steel. In various embodiments, the first member is a tubular member or a solid member, and the second member is a tubular member or a solid member. After applying the border layer, the first member and its border layer undergo a post-weld heat treatment to regain or establish desired metallurgical properties in the first member or border layer. In at least some examples, a post-weld heat treatment of the first member and its border layer reestablishes toughness or yield strength to a value substantially equal to a value for the corresponding original materials, which may be called the base materials, of these features. In some examples, toughness is increased, and yield strength is decreased by the post-weld heat treatment. The reduction of yield strength correlates to a desirable reduction in brittleness. Without being limited to a particular theory, the border layer of weld material on the first member may perform as a buffer or insulator to protect the first member (which has desired metallurgical properties) from the full effect of the heat introduced while welding the body weld to join the first member to the second member.

Figure 1:
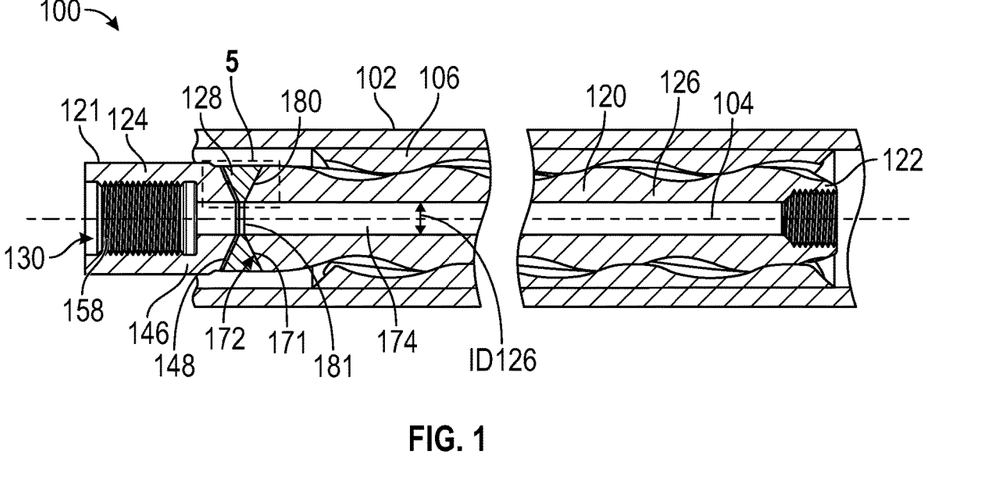
FIG. 1 shows a perspective front view of an embodiment of a mud motor including a tubular stator and welded rotor disposed in a tubular housing in accordance with principles described herein.

Referring to FIG. 1, in an exemplary embodiment, a mud motor 100 includes members joined by a welded formed in accordance with principles described herein. Mud motor 100 includes tubular housing 102 extending along a centerline axis 104, a concentric tubular stator 106 received in housing 102, and a rotor 120 received in stator 106. Rotor 120 extends from a first end 121 to a second end 122 and includes a threaded fitting 124 at end 121, a rotor member 126 extending from fitting 124 to end 122, and weld 128 attaching or coupling the fitting 124 to rotor member 126, forming a welded joint therebetween. Rotor 120 includes a through-passageway 130 extending axially from end 121 to end 122, making rotor 120 tubular. Passageway 130 is centered on axis 104.

Figure 2:
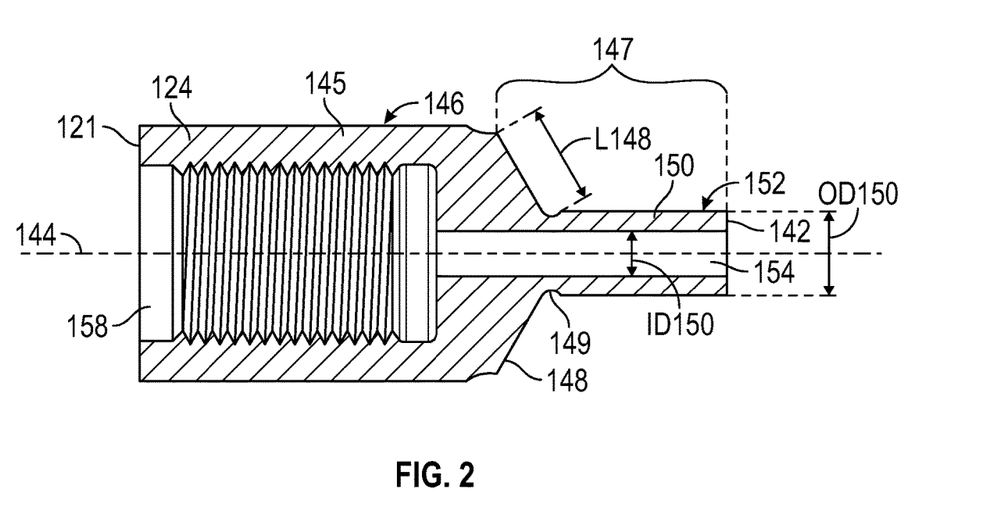
FIG. 2 shows a cross-sectional view of a threaded fitting as it may be fabricated in preparation for the fabricating the rotor of FIG. 1 in accordance with principles described herein.

FIG. 2 shows threaded fitting 124 as it may be manufactured in preparation for fabricating rotor 120 of FIG. 1. Threaded fitting 124 extends from first end 121 to a second end 142 along a central axis 144 and includes a tubular body 145 extending from the first end 121 and includes a weld-participating end portion or end 147, extending from tubular body 145 to second end 142. Tubular body 145 includes an outer surface 146. Weld-participating end 147 includes a joint surface 148 suitable for receiving a weld. Joint surface 148 tapers with respect to axis 144 as it extends radially inward from the outer surface 146 along a length L148. End 147 further includes a recessed surface or groove149 that is annular and forms an end portion of joint surface 148, and includes a tubular extension or neck 150 that extends from body 145 and groove 149 to second end 142. Neck 150 includes an outer surface 152 that intersects groove 149 and has an outer diameter OD150, which in this example is uniform. A channel 154 extends along axis 144 from end 142 through neck 150 and into body 145. Channel 154 includes an inner diameter ID150, which in this example is uniform. An internally treaded chamber 158 extends into tubular body 145 from end 121 and intersects channel 154. Chamber 158 is configured to receive a threaded end of another member that may be attached to rotor 120. Configured in this manner, fitting 124 may be called a box end. Fitting 124 is an example of a first tubular member having a first weld-participating end 147.

Referring again to FIG. 1, a tubular rotor member 126 extends from second end 122 to a weld-participating end 171, which includes a tapered joint surface 172 suitable for welding. Weld 128 couples fitting 124 to rotor member 126. Weld 128 is disposed in a trough or groove 180 that includes the joint surfaces 148, 172 of weld-participating ends 147, 171, respectively. A channel 174 having an inner diameter ID126 extends through rotor member 126. Thus, rotor member 126 is an example of a second tubular member having a second weld-participating end 171. In the finished, assembled rotor 120 of FIG. 1, channel 174 extends through rotor member 126, weld 128, and into fitting 124, intersecting the treaded chamber 158. Interconnected for fluid communication, channel 174 and chamber 158 form the passageway 130 through the full length of rotor 120.

Figure 3:
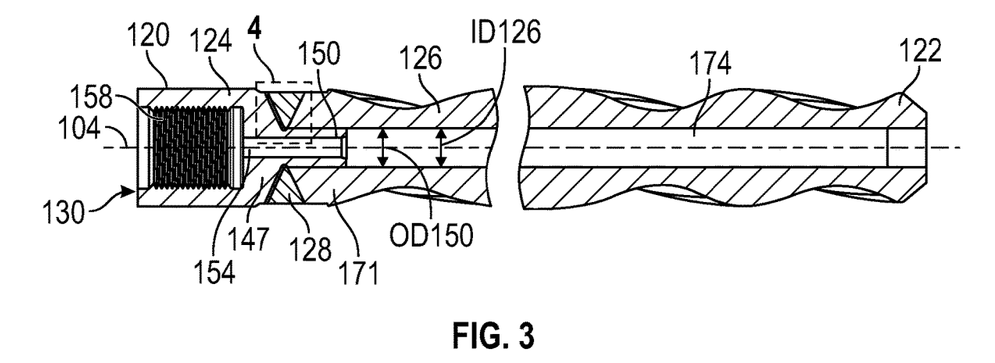
FIG. 3 shows a cross-sectional view of the rotor FIG. 1 during a phase of fabrication, the rotor having a weld formed in accordance with principles described herein.

FIG. 3 shows rotor 120 during a late stage of manufacturing. Fitting 124 is aligned with rotor member 126 along centerline 104. A portion (e.g. neck 150) of the first weld-participating end 147 on fitting 124 has been inserted inside a portion of the second weld-participating end 171, being received in channel 174. Thus, ends 147, 171 overlap, and the outer diameter OD150 of neck 150 is received within the inner diameter ID126 of rotor member 126. Insertion and overlapping is performed prior to bonding the tubular members 124, 126 together with weld 128. Passageway 130, albeit not necessarily in its final configuration, extends through fitting 124 and rotor 126, comprising channels 154, 174, and chamber 158. In some embodiments, a rotor that replaces rotor 120 lacks a through-passageway 130, lacking a channel 154 or a channel 174, as examples. In such embodiments, the rotor may include the internally treaded chamber 158 and, in at least some examples, may be described as a solid rotor.

Figure 4:
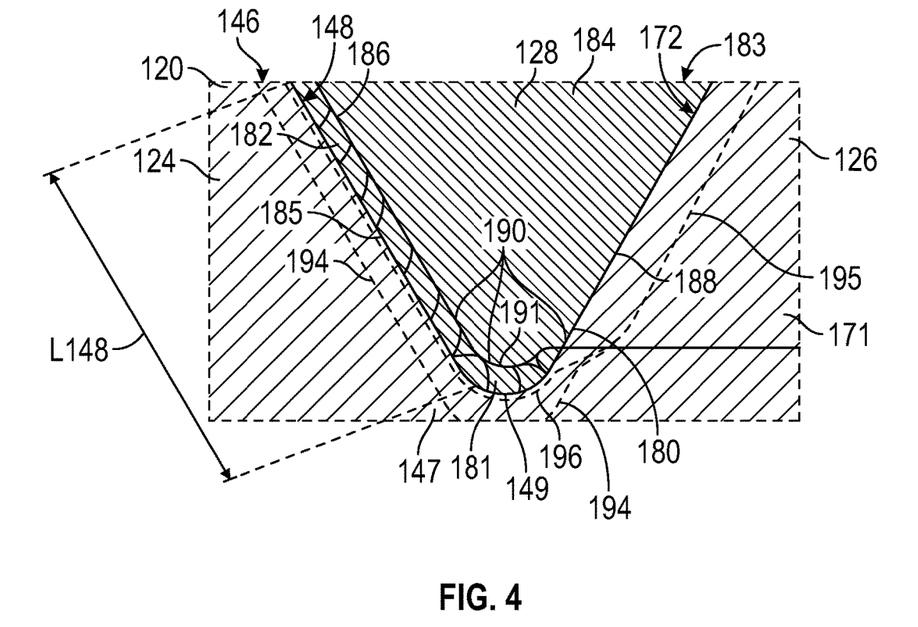
FIG. 4 shows a close, cross-sectional view of the rotor and the weld of FIG. 3.

Referring now to the close view of FIG. 4, weld 128 on rotor 120 extends from a root 181 to an outer surface 183, proximal outer surface 146 of fitting 124 or the outer surface of rotor member 126. Weld 128 includes a border layer 182 bonded to joint surface 148 of fitting 124 and a weld body 184 extending between border layer 182 and joint surface 172 of rotor member 126. Border layer 182 is applied to joint surface 148 prior to the formation of weld body 184. A weld boundary or interface 185 is formed between the layer 182 and fitting 124 along joint surface 148. Border layer 182 may be applied in multiple, adjoining weld passes located along the length L148 of the tapered portion of joint surface 148 and along groove 149. In at least some embodiments, the weld passes of border layer 182 are annular about axis 104 (FIG. 3). In some embodiments, border layer 182 includes multiple layers with each layer substantially parallel or contoured to surface 148 and having multiple, adjoining weld passes. Disposed as a covering to surface 148 including groove 149, border layer 182 serves to prepare and to protect the material of fitting 124 from the intensity or duration of the heating that is applied when forming weld body 184. The forming of weld body 184 affixes fitting 124 relative to rotor member 126. In general weld body 184 includes multiple layers of weld material with each layer formed by a weld pass or multiple weld passes. A weld interface 186 is disposed between border layer 182 and weld body 184 and is substantially parallel to surface 148. Interface 186 is contoured to follow surface 148, including groove 149. Another weld interface 188 is formed between weld body 184 and rotor member 126 along joint surface 172. Since fitting 124 and rotor member 126 are tubular in this example, border layer 182 and weld body 184, formed at ends 147, 171, are annular. Weld 128 is annular.

In this configuration or at this stage of manufacturing, the groove 180 that contains border layer 182 and weld body 184 of weld 128 is three-sided in the axially-extending sectional view of FIG. 4. The three sides of groove 180 includes the tapered portion of joint surface 148, groove 149, and joint surface 172 of weld-participating ends 147, 171. Groove 149 is a root of the trough or groove 180. After completing border layer 182, another three-sided groove 190 receives weld body 184. Groove 190 includes joint surface 172 on the rotor member 126 and the surface region of border layer 182, which is on fitting 124. Radially, groove 190 extends from a root 191 to or toward the outside surface 146 of fitting 124 and the outside surface of rotor member 126. Root 191 includes the surface region of border layer 182 that is located proximal the root or trough 149. Referring to the completed weld 128 in FIG. 4, groove 190 extends along joint surface 172 and weld interface 186. Groove 149 receives root 181 of weld 128. In FIGS. 3 and 4, root 181 includes a portion of border layer 182 and a portion of weld body 184.

In some embodiments, the groove that receives weld body 184 is two-sided, as may be the case when the axial length of groove 149 is sufficiently shorter than shown in FIG. 4. Some embodiments of rotor 120 may include a two-side groove in place of groove 180 to receive all of weld 128, including border layer 182. In such embodiments, joint surface 148 of fitting 124 may lack a groove 149 and the inner end of border layer 182 may be reconfigured, being straight, as an example.

The welding of border layer 182 on fitting 124 causes distinct metallurgical changes, e.g. changes to crystalline microstructures, within a heat-affected zone 194 of fitting 124. In heat-affected zone 194, for example, some tempered martensite is converted to untempered martensite, which is detrimentally brittle, in some embodiments. The generalized location of zone 194 extends inward from surface 148 to a boundary that is estimated and indicated with a dashed line in FIG. 4. The development of heat-affected zone 194 during this first stage of welding is a motivation for a post-weld heat treatment of fitting 124 and border layer 182, as discussed here and elsewhere herein. In various embodiments, the post-weld heat treatment reconfigures heat-affected zone 194, redeveloping types of microstructures that previously existed or developing other desired microstructures. In some cases, the net effect is that zone 194 becomes similar or equivalent, again, to other regions in fitting 124. In various embodiments, the post-weld heat treatment reduces or eliminates unwanted microstructures that may have developed while welding border layer 182 to fitting 124. As an example, untempered martensite microstructures are converted back to tempered martensite microstructures in zone 194 of fitting 124. In at least some embodiments, zone 194 on fitting 124 lacks untempered martensite after the post-weld heat treatment. In at least some embodiments, all of fitting 124 lacks untempered martensite after the post-weld heat treatment. The determination that zone 194 or all of fitting 124 lacks untempered martensite may be achieved by evaluating four representative portions of a fitting 124, including at least one portion located in zone 194.

The welding of body 184 to border layer 182 and surface 172 creates a heat-affected zone 195 in member 126 and a heat-affected zone 196 that includes border layer 182. The generalized, inner boundaries of zones 195, 196 are estimated and indicated with dashed lines. Zone 196 extends from weld interface 186 into weld layer 182 and, for some embodiments, into fitting 124. In the example of FIG. 4, the depth of zone 196 into fitting 124 is significantly less than the depth of zone 194, which was discussed above. For example, in some embodiments, the welding of body 184 does not develop or include untempered martensite in zone 196 nor in any other part of zone 194. In some embodiments, the metallurgical changes within fitting 124, including zone 194, due to welding the weld body 184 are minimal or negligible. In such embodiments, it may be said that heat-affected zone 196 extends into border layer 182 and not into fitting 124. In at least some embodiments, zone 194 on fitting 124 lacks untempered martensite after the welding of weld body 184 is completed and the fabrication of rotor 120 is completed. In at least some embodiments, all of fitting 124 lacks untempered martensite after the welding of weld body 184 is completed and the fabrication of rotor 120 is completed.

Referring again to FIG. 3, in various examples, the fabrication of rotor 120 includes machining an inner portion of fitting 124 to enlarge the portion of passageway 130 that extends through fitting 124. This may involve following the centerline 104 with a cutting tool to cut and remove a portion or all of neck 150 at weld-participating end 147. An inner portion of fitting body 145 may also be removed. The inner diameter ID150 may be expanded to become larger. To achieve the rotor configuration of FIG. 1, all of neck 150 is removed, exposing root 181 of weld 128 to the passageway 130. In this example, the exposed portion of root 181 includes a portion of border layer 182 and a portion of weld body 184. Thus, border layer 182 becomes a portion of the wall for passageway 130. As a result, channel 154 in fitting 124 is expanded to merge with channel 174 and weld 128, including a portion of border layer 182, becomes a part of the wall of channel 174. In this example, the internal machining of fitting 124 achieves a uniform inner diameter equal to ID126 from rotor end 122 to chamber 158. In some embodiments, rotor 120, as shown in FIG. 3, is used in mud motor 100 without machining fitting 124 to reduce or remove the neck 150.

Continuing to reference FIG. 3, examples of materials selected for the components of rotor 120 will now be considered. In various embodiments, threaded fitting 124, which is an example of a weldable first member, includes high-strength low alloy steel. As used herein, including in the claims set out below, the phrase "high-strength low alloy steel" means: (1) steels that fall within the ASTM A322 specification; or (2) AISI 4330 steels, including but not limited to, 4330V. For clarity, AISI 4330 steels are "high-strength low alloy steel" even though AISI 4330 does not fall within the ASTM A322 specification. Some examples of high-strength low alloy steel suitable for fitting 124 or another first member to be welded include material types AISI4330, AISI 4130, AISI 4140, or AISI 4145. Material type 4330V is a version of 4330 that includes vanadium and is suitable for fitting 124 or another first member to be welded. A plurality of grades and ranges of hardness may be available and may be considered for the first member to be welded. Desirable characteristics for a high-strength low alloy steel for fitting 124a or another first member to be welded include having a yield strength of 150 to 165 KSI (thousand pounds per square inch) or higher and toughness of 30 to 40 ft-lbs, as may be measured by a Charpy v-notch impact test. Toughness is, for example, an indicator of ductility, brittleness, bending resistance, or impact resistance. For some embodiments, high-strength low alloy steel is chosen having a toughness of 35 ft-lb. Toughness values of 30 to 40 ft-lbs in fitting 124 in the heat affected zone adjacent weld 128 are achieved by a post-weld heat treatment performed in accordance with the principles disclosed herein. Some embodiments have toughness greater than 40 ft-lbs, due to the effect of a post-weld heat treatment performed in accordance with the principles disclosed herein. For some embodiments, high-strength low alloy steel may be selected with a lower value of yield strength, such as a yield strength less than 150 KSI and greater than 120 KSI. Some embodiments may use a still lower value of yield strength. It is desirable to improve the galling resistance of the fitting 124 or other first member to be welded as compared to the galling resistance of the material of the rotor member 126 or another second member to be welded. Ideally, the highest strength material that is readily available would be used.

In various embodiments, rotor member 126, which is an example of a second member to be welded, includes a stainless steel. In some of these embodiments a precipitation hardened (PH) stainless steel is utilized. Examples of PH stainless steel that may be used include material type 15-5, type 17-4, and type 13-8 according to the ASTM A564 specification and include the similar or equivalent types designated as S17400 and S13800, respectively, according to the UNS. A plurality of grades and ranges of hardness are available and may be considered for these stainless steels. Some hardness values that may be used include H900 and H1150, of which H1150 is commonly used for some other downhole tools. For some embodiments, the PH stainless steel has a minimum yield strength of 105 KSI (thousand pounds per square inch) and a minimum toughness of 35 ft-lbs, meaning the PH stainless steel has a yield strength of 105 KSI or greater and has a notch impact property of 35 ft-lbs or greater Referring to FIG. 3 and FIG. 4, in various embodiments, the material for weld 128 includes a super duplex stainless steel alloy, such as material type E2594 or a duplex stainless steel alloy such as E2209. Some embodiments, the material for weld 128 includes ER630, which is basically the same material as 17-4. When ER630 material is used, a heat treating process, such as age hardening, is performed after welding. For various embodiments, age hardening may also be applied when another type of weld material is used. For some embodiments, the minimum yield strength that is achieved in a weld made from ER2594 material is equal or greater that the minimum yield strength of the 17-4 material. In some embodiments, border layer 182 and weld body 184 are formed from the same weld material, and in other embodiments, they are formed from different weld material.

An exemplary embodiment is summarized as follows: The fitting 124 is formed from material type 4330V, and the heat-affected zone (HAZ) of fitting 124 has an average toughness of substantially 83 ft-lb. The rotor member 126 is formed from material type 17-4, and the HAZ of member 126 has an average toughness of substantially 153 ft-lb. The border layer 182 is formed from E2594 super duplex stainless steel and has an average toughness of substantially 89 ft-lb. The weld body 184 is formed from E2594 super duplex stainless steel and has an average toughness of substantially 180 ft-lb. For various embodiments, a goal is to achieve a toughness having an average value of at least 35 ft-lb for fitting 124, weld 128, or another component or location in rotor 120 or another welded tubular member formed in accordance with principles described herein.

An exemplary embodiment of rotor 120 and weld joint 128 includes a rotor member 126 that has an average toughness equal to a toughness stated elsewhere in this disclosure or is another suitable value, and fitting 124 has an average toughness that is substantially 54% of the average toughness of the rotor member. The border layer 182 has an average toughness that is substantially 58% of the average toughness of rotor member 126; and in some embodiments, the body 184 of the weld material has an average toughness that is greater than the average toughness of the rotor member. In some embodiments, the average toughness of body 184 is substantially 118% of the average toughness of the rotor member.

An exemplary embodiment of rotor 120 and weld joint 128 includes a fitting 124 that includes 4330V high-strength low alloy steel, and rotor member 126 includes PH stainless steel is selected from among a group that includes stainless steels equivalent to type 15-5, type 17-4, and type 13-8 as defined by ASTM A564.

In some examples, rotor member 126 of FIG. 3 is the remaining part of an initial rotor that needed repair. In the initial rotor included a fitting or box end extending from the portion that comprises rotor member 126 with or without an intervening weld. The box end may have had thread damage, such as galling, from prior use. In the scenario being considered, prior to fabricating rotor 120 of FIG. 3, rotor member 126 was cut from the initial rotor, and joint surface 172 was shaped, preparing it for welding. In some examples, the initial rotor was formed from a single or uniform type of material, such as a PH stainless steel. In other examples, another fitting 124 was attached and later removed due to damage, to be replaced by the fitting 124 of FIG. 3.

Figure 5:
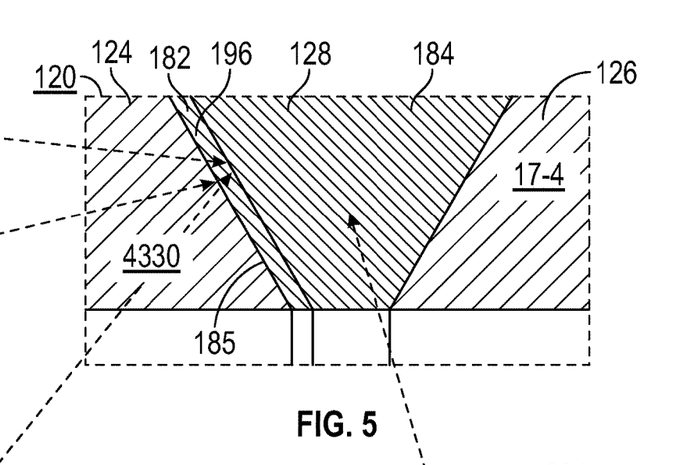
FIG. 5 shows a close, cross-sectional view of the rotor and the weld of FIG. 1 in accordance with principles described herein.
Figure 6:
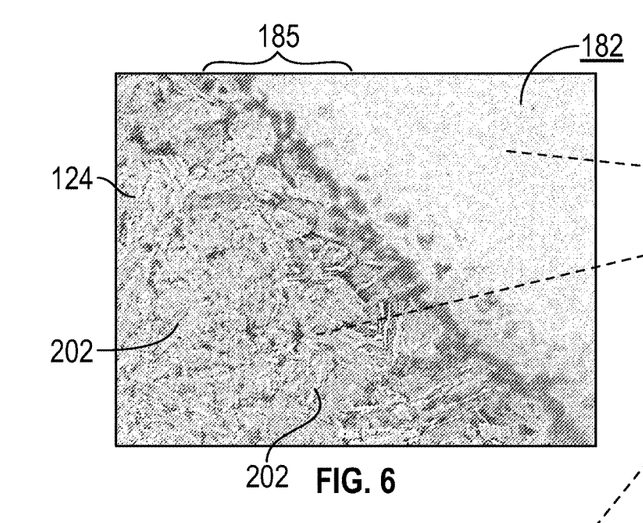
FIG. 6 shows a magnified view of a portion of the weld of FIG. 5, the portion including the weld border layer and the fitting.
Figure 7:
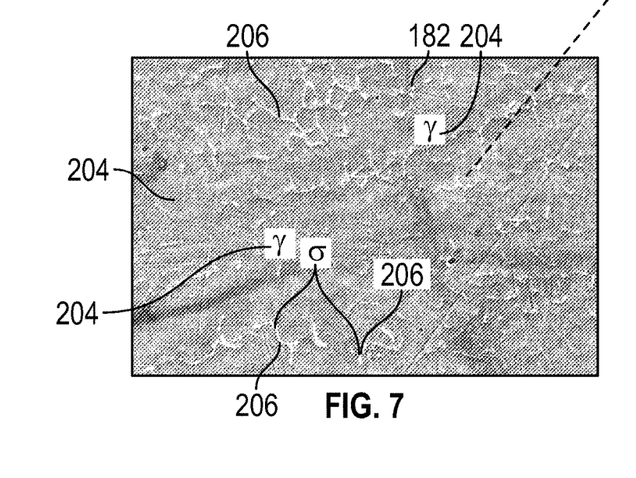
FIG. 7 shows a magnified view of a portion of the weld border layer of FIG. 5.
Figure 8:
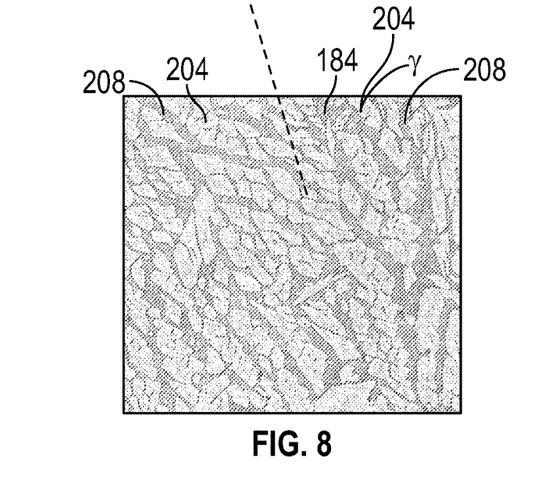
FIG. 8 shows a magnified view of a portion of the weld body of FIG. 5.

FIG. 5 shows a close, cross-sectional view of an embodiment of rotor 120 with weld 128 from FIG. 1. In this embodiment, fitting 124 comprises type 4330V high-strength low alloy steel, rotor member 126 comprises type 17-4 stainless steel, and weld 128 comprises a duplex stainless steel, as examples. Border layer 182 and weld body 184 of weld 128 are applied using the method described above. In FIG. 5, heat-affected zone 196, which results from welding the weld body 184 to border layer 182, generally corresponds to border layer 182. FIG. 6 shows a magnified view of the fusion zone or interface 185 between fitting 124 and border layer 182 of FIG. 5. The martensite or martensitic microstructures 202 in fitting 124 are visible. An etching process was used to enhance the visibility of the structures. FIG. 7 shows a magnified view of a portion of the border layer 182 of FIG. 5 using a different type of etching process than was used for FIG. 6. FIG. 7 shows that border layer 182 includes Austenite, which includes gamma (γ) microstructures 204. Layer 182 also includes sigma (σ) microstructures 206, which may be transformed from ferrite. The sigma (σ) microstructures 206 appear as thin, curves or valleys between larger, rounded regions of gamma (γ) microstructures 204. In FIG. 5 and FIG. 6, border layer 182 lacks ferrite microstructures. FIG. 8 shows a magnified view of a portion of the weld body of FIG. 5. FIG. 8 shows a magnified view of a portion of the weld body 184 of FIG. 5. Weld body 184 includes microstructures having a ferrite 208 matrix with austenite 204 islands. The ferrite matrix or microstructures may also be called alpha (α) microstructures 208, and the austenite includes gamma (γ) microstructures 204. FIGS. 6, 7, 8 have the same magnification. In various embodiments, border layer 182 and weld 184 body include duplex, super duplex, or martensitic microstructures, as examples.

Figure 9:
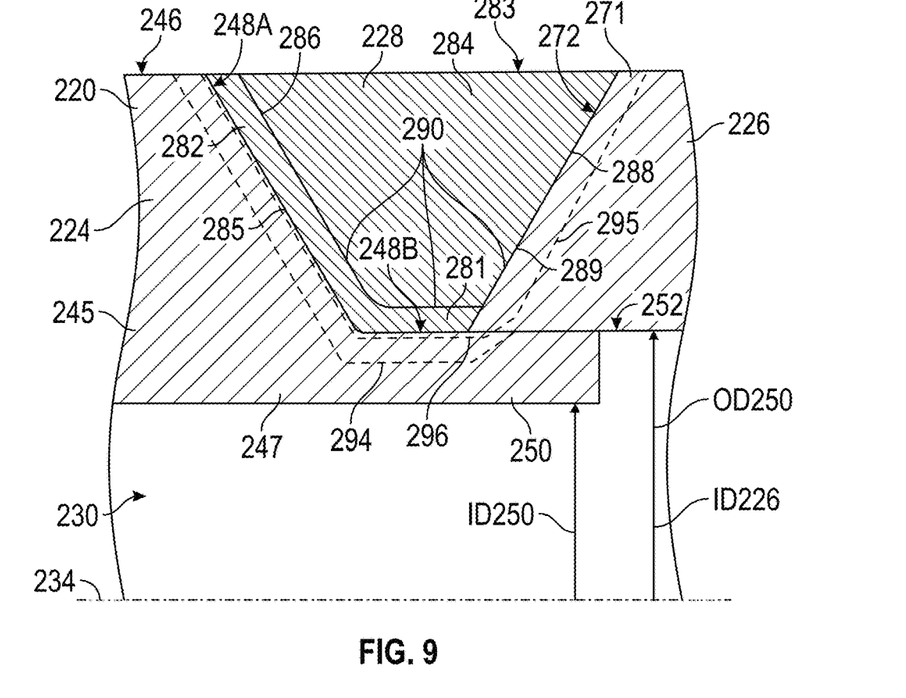
FIG. 9 shows a close, cross-sectional view of another weld configured to join two dissimilar metals together in accordance with principles described herein.

FIG. 9 shows a close view of an embodiment of a fabricated member 220 that includes a tubular first member 224 of a first material joined to a tubular second member 226 of another material at a welded joint formed with a weld 228. A passageway 230 extends through members 224, 226, which are disposed around a longitudinal or central axis 234. Weld 228 is configured to join two dissimilar metals together. In some embodiments, tubular first member 224 is formed from a high-strength low alloy steel and second member 226 is formed from a stainless steel. In at least some examples member 226 comprises PH stainless steel. The materials for members 224, 226 and weld 228 may be selected from any of the respective materials that are described herein or others that are suitable in view of this disclosure. In some examples, fabricated member 220 is a replacement for rotor 120 of FIG. 1 and FIG. 3.

Tubular first member 224 includes an annular body 245 extending to a weld-participating end portion or end 247. Tubular body 245 includes an outer surface 246, and weld-participating end 247 includes a joint surface 248 suitable for welding and a tubular extension or neck 250. Neck 250 that extends from body 245 and is disposed within second member 226 in FIG. 9. Neck 250 includes an outer surface 252 having an outer diameter OD250, which in this example is uniform, and includes an inner diameter ID250, which in this example is uniform. In the close view of FIG. 9, outer diameter OD250 and inner diameter ID250 are indicated by their radii. Joint surface 248 includes first and second surface regions 248A, 248B. First surface region 248A tapers with respect to axis 234 as it extends radially inward from the outer surface 246 toward neck 250. Surface region 248B extends axially away from region 248A along a portion of the neck's outer surface 252. Tubular second member 226 includes a weld-participating end 271 with a tapered joint surface 272 suitable for welding. Member 226 has an inner diameter ID226 that receives neck 250.

Weld 228 extends from a root 281 to an outer surface 283 and includes a border layer 282 bonded to the first member 224 and a weld body 284 extending between border layer 282 and joint surface 272 of second member 226. Border layer 282 is welded to joint surface 248 of weld-participating end 247. Border layer 282, which may also be called a buttering layer or a butter layer, is applied to joint surface 248 prior to the formation of weld body 284 to protect first member 224 from excess heating, e.g. the intensity or duration of the heating due to welding the body 284. A weld boundary or interface 285 is formed between the layer 282 and first member 224 along joint surface 248. Border layer 282 may be applied in multiple, adjoining weld passes located along regions 248A, 248B of joint surface 248. In at least some embodiments, the weld passes of border layer 282 are annular about axis 234. In some embodiments, border layer 282 includes multiple layers with the layers substantially parallel or contoured to surface regions 248A, 284B and having multiple, adjoining weld passes. The forming of weld body 284 affixes first member 224 relative to second member 226. In general weld body 284 includes multiple layers of weld material with each layer formed by a weld pass or multiple weld passes. A weld interface 286 is disposed between border layer 282 and weld body 284 and is substantially parallel to surface 248. Interface 286 is contoured to follow surface 248. Another weld interface 288 is formed between weld body 284 and second member 226 along joint surface 272. Since first and second members 224, 226 are tubular in this example, border layer 282 and weld body 284, formed at ends 246, 271, are annular. Weld 228 is annular, being disposed about first member 224.

In this configuration or at this stage of manufacturing, weld 228 is disposed in a three-sided trough or groove 289 that includes regions 248A, 248B of joint surface 248 and joint surface 248. After completing border layer 282, a three-sided trough or groove 290 receives weld body 284. Groove 290 includes the upper, tapered and axially-extending surfaces of border layer 282 (e.g. where weld interface 286 is formed) on first member 224 and includes joint surface 272 on the second member 226. Depending on the dimensions chosen for members 424, 426, groove 489 or groove 490 is two-sided in some embodiments.

The welding of border layer 282 on member 224 creates a heat-affected zone 294. The generalized location of zone 294 extends inward from surface 248 to a boundary that is estimated and indicated with a dashed line in FIG. 9. The welding of body 284 to border layer 282 and surface 272 creates a heat-affected zone 295 in second member 226 and creates a heat-affected zone 296 that includes border layer 282 and, in some embodiments, first member 224. In general, the metallurgical characteristics of members 224, 226; weld 228; and zones 294, 295, 296 are, in general, similar to the metallurgical characteristics of members 124, 126; weld 128; and zones 194, 195, 196, respectively, when the materials used for members 224, 226 and weld 228 are similar to the materials used for members 124, 126 and weld 128, respectively and when the disclosed welding techniques are used. For example, the microstructure discussion of FIGS. 5-8 pertains to various embodiments of fabricated member 220 when corresponding materials are welded.

In various examples, the fabrication of tubular member 220 includes machining an inner portion of first member 224 to enlarge a portion of passageway 230. This may involve following the centerline 234 with a cutting tool to cut and remove a portion of body 245 and a portion or all of neck 250 at weld-participating end 247 to expand the inner diameter ID250 to be larger or to be removed. As a result, in some embodiments, the final diameter of passageway 230 is uniformly equal to inner diameter ID226, and weld 228 is exposed to passageway 130 with weld root 281, including a portion of border layer 282 serving a portion of the wall for passageway 230.

Figure 10:
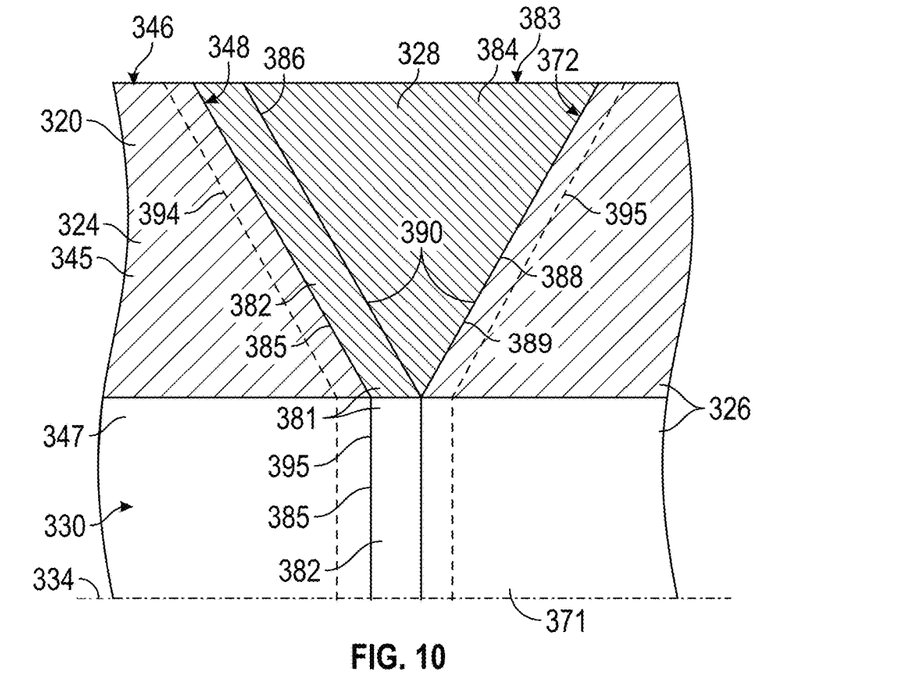
FIG. 10 shows a close, cross-sectional view of yet another weld configured to join two dissimilar metals together in accordance with principles described herein.

FIG. 10 shows a close view of a fabricated tubular member 320 that includes a tubular first member 324 of a first material joined to a tubular second member 326 of another material at a welded joint formed with a weld 328. A passageway 330 extends through members 324, 326, which are disposed around a longitudinal or central axis 334. Weld 328 is configured to join two dissimilar metals together. In some embodiments, tubular first member 324 is formed from a high-strength low alloy steel and second member 326 is formed from a stainless steel. In at least some examples member 326 comprises PH stainless steel. The materials for member 324, 326 and weld 328 may be selected from any of the respective materials that are described herein or others that are suitable in view of this disclosure. In some examples, fabricated member 320 is a replacement for rotor 120 of FIG. 1 and FIG. 3.

Tubular first member 324 includes an annular body 345 extending to a weld-participating end portion or end 347. Tubular body 345 includes an outer surface 346, and weld-participating end 347 includes a joint surface 348 suitable for welding. Joint surface 348 tapers with respect to axis 334 as it extends radially inward from the outer surface 346. In this embodiment, end 347 does not include a tubular extension or neck extending into second member 326. Tubular second member 326 includes a weld-participating end 371 with a tapered joint surface 372 suitable for welding. The inner diameters and radii of member 324, 326 and weld 328 are substantially the same, forming the passageway 330.

Weld 328 extends from a root 381 to an outer surface 383 and includes a border layer 382 bonded to the first member 324 and a weld body 384 extending between border layer 382 and joint surface 372 of second member 326. Border layer 382 is welded to joint surface 348 of weld-participating end 347. Border layer 382, which may also be called a buttering layer or a butter layer, is applied to joint surface 348 prior to the formation of weld body 384. A weld boundary or interface 385 is formed between the layer 382 and first member 324 along joint surface 348. Border layer 382 may be applied in multiple, adjoining weld passes located along the tapered length of joint surface 348. In at least some embodiments, the weld passes of border layer 382 are annular about axis 334. In some embodiments, border layer 382 includes multiple layers with each layer substantially parallel or contoured to surface 348 and having multiple, adjoining weld passes. Disposed as a covering to surface 348 and region 354, border layer 382 serves to prepare and to protect the material of first member 324 from the intensity or duration of the heating that is applied when forming weld body 384. The forming of weld body 384 affixes first member 324 relative to second member 326. In general weld body 384 includes multiple layers of weld material with each layer formed by a weld pass or multiple weld passes. A weld interface 386 is disposed between border layer 382 and weld body 384 and is substantially parallel to surface 348. Interface 386 is contoured to follow surface 348. Another weld interface 388 is formed between weld body 384 and second member 326 along joint surface 372. Since first and second members 324, 326 are tubular in this example, border layer 382 and weld body 384, formed at ends 346, 371, are annular. Weld 328 is annular.

Continuing to reference FIG. 10, weld 328 is supported on two sides by joint surface 348. A third side of weld 328 is formed along passageway 330 by border layer 282. Thus, in effect, weld 328 is disposed in a three-sided trough or groove 389. After completing border layer 382, a two-sided trough or groove 390 receives weld body 384. Groove 390 includes the tapered, upper surface of border layer 382 on first member 324 and joint surface 372 on the second member 326. Weld 328 is a butt weld, but the adjacent ends of first and second members 324, 326 do not contact each other directly; instead, members 324, 326 are separated by and contact the border layer 328.

The welding of border layer 382 on member 324 creates a heat-affected zone 394. The generalized location of zone 394 extends inward from surface 348 to a boundary that is estimated and indicated with a dashed line in FIG. 9. The welding of body 384 to border layer 382 and surface 372 creates a heat-affected zone 395 in second member 326 and creates a heat-affected zone 396 that includes border layer 382 and, in some embodiments, first member 324. In general, the metallurgical characteristics of members 324, 326; weld 328; and zones 394, 395, 396 are, in general, similar to the metallurgical characteristics of members 124, 126; weld 128; and zones 194, 195, 196, respectively, when the materials used for members 324, 326 and weld 328 are similar to the materials used for members 124, 126 and weld 128, respectively and when the disclosed welding techniques are used. For example, the microstructure discussion of FIGS. 5-8 pertains to various embodiments of fabricated member 320 when corresponding materials are welded.

Because inner diameters of member 324, 326 and weld 328 are substantially the same, the fabrication of some embodiments will not include machining an inner portion of first member 324 to make passageway 330 uniform. Weld 328 is exposed to passageway 130 with weld root 381, including a portion of border layer 382 serving as a portion of the wall for passageway 330. The fabrication of some other embodiments does include machining or cutting of an inner portion(s) of first member 324, second member 226, or weld 328 to make passageway 330 uniform in diameter.

Figure 11:
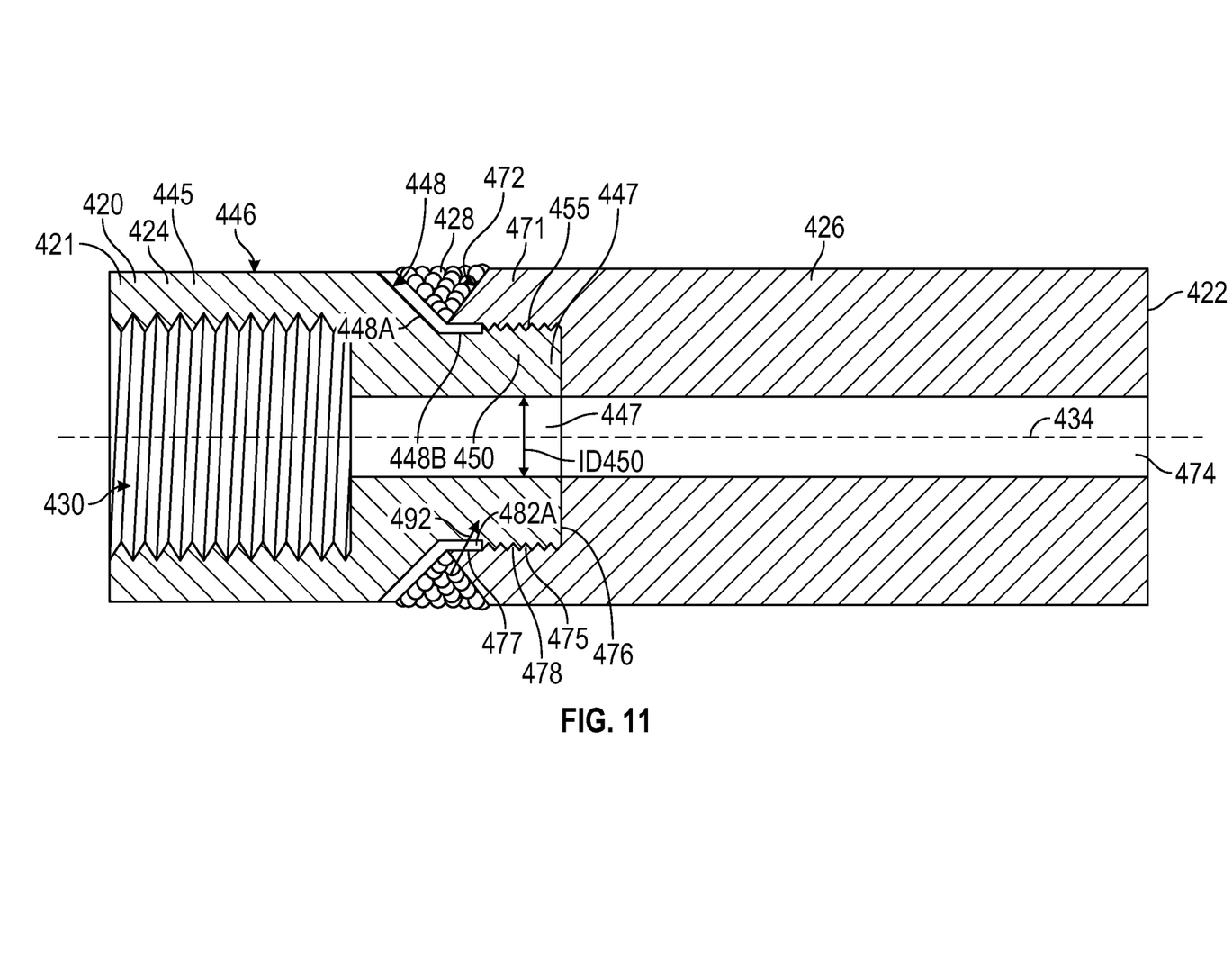
FIG. 11 shows a welded tubular member having a first member and a second member joined at a threaded coupling and welded in accordance with principles described herein.

FIG. 11 shows a close view of an embodiment of a fabricated member 420 that extends from a first end 421 to a second end 422 and includes a tubular first member 424 of a first material joined to a tubular second member 426 of another material at a welded joint formed with a weld 428. A passageway 430 extends through members 424, 426, which are disposed around a longitudinal or central axis 434. Weld 428 is configured to join two dissimilar metals together. In some embodiments, tubular first member 424 is formed from a high-strength low alloy steel and second member 426 is formed from a stainless steel. In at least some examples member 426 comprises PH stainless steel. The materials for members 424, 426 and weld 428 may be selected from any of the respective materials that are described herein or others that are suitable in view of this disclosure. In some examples, fabricated member 420 is rotor that is configured as a replacement for rotor 120 of FIG. 1 and FIG. 3.

Tubular first member 424 includes a threaded fitting having an annular body 445 extending from end 421 to a weld-participating end portion or end 447. Tubular body 445 includes an outer surface 446, and weld-participating end 447 includes a joint surface 448 suitable for welding and a tubular extension or neck 450. Joint surface 448 includes first and second surface regions 448A, 448B. First surface region 448A tapers with respect to axis 434 as it extends radially inward from the outer surface 446, and surface region 448B extends axially, away from region 448A. Neck 450 that extends from body 445 and is disposed within second member 426 in FIG. 11. The outer surface of neck 450 includes surface region 448B and a threaded region 455 extending therefrom, distal surface region 448A. Neck 450 includes an inner diameter ID450.

Tubular second member 426 includes a weld-participating end 472 with a tapered joint surface 471 suitable for welding. A channel 474 having an inner diameter ID126 extends through rotor member 126 from end 422. Inner diameter ID426 that is substantially equal to inner diameter ID450 of neck 450. Member 426 also includes an axially-aligned counterbore 475 that intersects channel 474 at a shoulder 476. Counterbore 475 includes a cylindrical region 477 that extends inward from weld surface 471 and a threaded region 478 that extends from region 477 toward shoulder 476. Rotor member 126 is an example of a second tubular member having a second weld-participating end 472.

Weld 428 extends from a root 481 to an outer surface 483 and includes a border layer 482 bonded to the first member 424 and a weld body 484 extending between border layer 482 and joint surface 471 of second member 426. Border layer 482, which may also be called a buttering layer or a butter layer, is welded to regions 448A, 448B of joint surface 448 on weld-participating end 447 prior to the formation of weld body 484. A weld boundary or interface 485 is formed between the layer 482 and first member 424 along joint surface 448. Border layer 482 may be applied in multiple, adjoining, annular weld passes. In some embodiments, border layer 482 includes multiple layers substantially parallel or contoured to regions 448A, 448B of surface 448 and having multiple, adjoining weld passes. After border layer 482 is welded to surface 448, member 424 is threaded into member 426, forming a threaded joint between regions 455, 478. A portion 482A of weld border layer 482 that is located on surface region 448B proximal threaded region 455 is received within cylindrical region 447 of counterbore 475 and does not contact weld body 484. In this configuration, weld border portion 482A and a portion of end 471 on member 426 together protect or insulate a portion of neck 450 from the heat of welding that is applied when weld body 484 is formed. For example, a direct flow path 492 for heat to travel from weld body 484 to a portion of neck 450 passes through both weld border portion 482A and end 471, both exhibiting thermal resistance to heat flow along path 492.

After border layer 482 is formed and cools to an acceptable temperature and after member 424 is threaded into member 426, weld body 484 is formed. The welded joint that is formed by adding weld body 484 between border layer 482 and surface 472 prevents the threaded joint at regions 455, 478 from unscrewing and affixes first member 424 relative to second member 426. In general weld body 484 includes multiple layers of weld material with each layer formed by a weld pass or multiple weld passes. A weld interface 486 is disposed between border layer 482 and weld body 484 and is substantially parallel to surface 448. Interface 486 is contoured to follow a portion of surface 448. Another weld interface 488 is formed between weld body 484 and second member 426 along joint surface 471. Since first and second members 424, 426 are tubular in this example, border layer 482 and weld body 484, formed at ends 446, 472, are annular. Weld 428 is annular. In this configuration, weld 428 is disposed in a three-sided trough or groove 489 that includes regions 448A, 448B of joint surface 448 and joint surface 448. After completing border layer 482, a trough or groove 490 receives weld body 484. Grove 490 includes surface 472 and a portion of the surface of border layer 482. Depending on the dimensions chosen for members 424, 426, groove 490 is three-sided in some embodiments and two-sided in others. In some embodiments, groove 489 is two sided when the ends of members 424, 426 join more closely than shown in FIG. 11.

The welding of border layer 482 on member 424 creates a heat-affected zone 494. The generalized location of zone 494 extends inward from surface 448 to a boundary that is estimated and indicated with a dashed line in FIG. 9. The welding of body 484 to border layer 482 and surface 472 creates a heat-affected zone 495 in second member 426 and creates a heat-affected zone 496 that includes border layer 482 and, in some embodiments, first member 424. In general, the metallurgical characteristics of members 224, 226; weld 228; and zones 494, 495, 496 are, in general, similar to the metallurgical characteristics of members 124, 126; weld 128; and zones 194, 195, 196, respectively, when the materials used for members 424, 426 and weld 428 are similar to the materials used for members 124, 126 and weld 128, respectively and when the disclosed welding techniques are used. For example, the microstructure discussion of FIGS. 5-8 pertains to various embodiments of fabricated member 420 when corresponding materials are welded.

Figure 12:
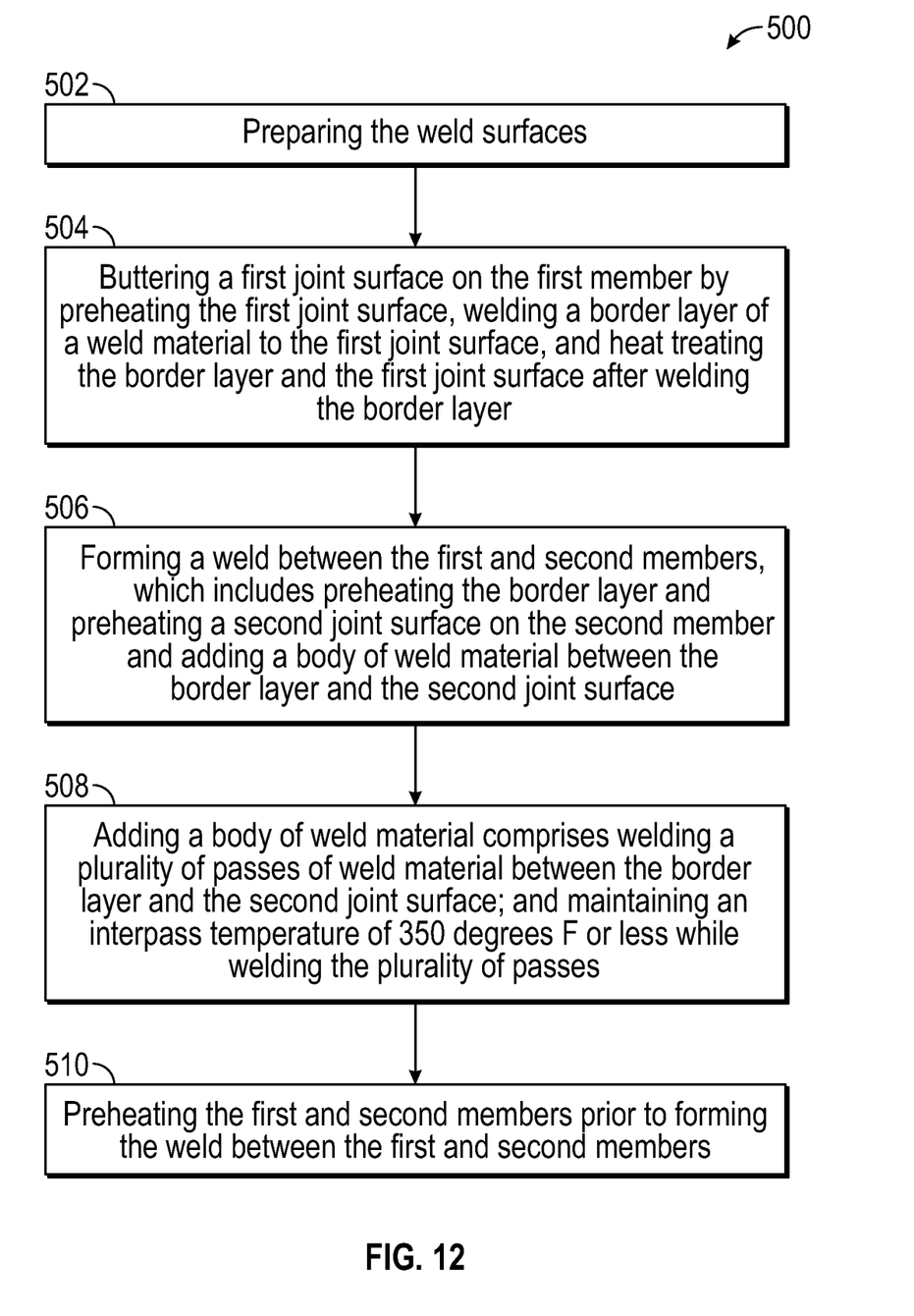
FIG. 12 shows a flow diagram showing a method for welding two dissimilar metals together in accordance with the principles described herein.

FIG. 12 shows a method 500 for welding two dissimilar metals together in accordance with the principles described herein. For example, method 500 may be used to join a high-strength low alloy steel first member to a stainless steel second member, using any of the weld materials previously described or others that are suitable to this welding process. The first and second members may be selected from any of the respective materials previously described or others materials that are suitable. The first and second members may be sheets or plates and may include curvature. The first and second members may tubular members or solid members. Method 500 could be performed to fabricate rotor 120 of FIG. 1 and FIG. 3 or any of the welded joints shown in FIGS. 4-7, as examples. At block 502, method 500 includes preparing the weld surfaces for welding. In various examples, this operation includes machining, cutting, grinding, or sanding the surfaces that will form a groove to receive the weld. Examples include joint surfaces 148, 172 of FIG. 4. In some examples, threads are added to weld receiving ends on first and second tubular members. Preparation may also include removing an existing, possibly damaged, fitting or box end from the tubular second member.

At block 504, method 500 includes "buttering" a first joint surface on to the first member in preparation for a subsequent weld to be applied. In this context, the term buttering includes preheating the first joint surface, welding a border layer of a weld material to the first joint surface, and heat treating the border layer and the first joint surface after welding the border layer, prior to adding a subsequent weld. A conventional buttering process lacks one or more of these steps. The heat treating of block 504 may be called a post-weld heat treatment. The border layer may be configured as previous described for multiple embodiments. In various examples, the border layer includes multiple, adjoining weld passes in a layer or multiple layers. A movement of the welding tool relative to a work piece, such as the first member, deposits a weld pass or elongate mound of welding material. Multiple passes are deposited side-by-side and overlap. An interpass temperature describes the temperature of the previously deposited material or the surface as it receives a subsequent weld pass. The interpass temperature is maintained at a fixed value or below a maximum value, within an acceptable range of tolerance. In some examples, the interpass temperature is maintained within the range 205 to 430 degrees Celsius (400 to 800° Fahrenheit) while depositing the border layer. In general, the post-weld heat treatment influences the border layer, the first joint surface, and other portions of the heat-affected zone of the first member (e.g. zone 194 in FIG. 4). A goal of the post-weld heat treatment is to ensure that appropriate metallurgical properties and microstructures are maintained, redeveloped, or developed in the material of the first member, which in this example is a high-strength low alloy steel. Without being limited to a particular theory, high-strength low alloy steels need a slow cooling rate after welding to avoid or to reverse the formation of a brittle microstructure in the heat-affected zone. Preheating the surrounding metal prior to welding, e.g., preheating the anticipated heat-affected zone and possibly other portions of the first member, adds heat that slows the cooling rate of the weld. Due to welding and initial cooling of the border layer and the first member, untempered martensite is formed in the border layer or another portion of the heat-affected zone. After welding, the post-weld heat treatment of the first member and its border layer is performed to influence the cooling rate or to implement a new cooling rate and, consequently, to transform the untempered martensite to tempered martensite.

In an example, the post-weld heat treatment of Block 504 includes heating the first member and its border layer to 566 C (1050 F) and then holding it at this temperature for 30 minutes per inch of thickness or longer. A hold time shorter than 30 minutes per inch of thickness may be used for some embodiments. As an example, referring to the generally tubular fitting 124 of FIG. 2 and its border layer 182 shown in FIG. 4, the thickness referenced here may be the wall thickness of the thickest portion of fitting 121, a wall thickness along the portion of 121 where border layer 182 is formed, or the diameter of one of these regions if fitting 121 lacks a chamber 158 or a channel 154. After the heating and the holding at the target temperature, the fitting and its border layer are cooled in a furnace or in an insulating wrap or container. The goal is to achieve a cooling rate sufficiently slower than air cooling such that untempered martensite is transformed to tempered martensite in the heat-affected zone or at least in the border layer. In various examples, the post-weld heat treatment uses a tempering temperature that is lower than the temperature used during earlier quench and temper processes for the material of the first member, but high enough to temper the microstructures in the heat-affected zone. A post-weld heat treatment tempering temperature of 566 C is one such example.

Block 506 includes forming a weld between the first and second members, which includes preheating the border layer and preheating a second joint surface on the second member and adding a body of weld material between the border layer and the second joint surface. The weld incorporates the weld body and the border layer, as previously described. As shown in block 508, in various examples, forming the body of the weld includes making multiple, adjoining weld passes in a layer or multiple layers between the border layer and the second joint surface. The interpass temperature is maintained at a fixed or below a maximum value, within an acceptable range of tolerance. In at least some embodiments, all portions of block 504 are completed prior to performing block 506. For example, in such embodiments, the post-weld heat treatment of the first member with its border layer added is completed before performing block 506.

In block 508, method 500 includes maintaining the interpass temperature at substantially 177° C. (350° F.) or less while welding the plurality of passes to avoid sensitization of the heat affected zone. For some examples, this includes maintaining the interpass temperature within the range 24° C. to 177° C. (75 F to 350 F) while welding the plurality of passes during block 508.

Block 510 includes preheating the first and second members prior to forming the weld between the first and second members, e.g., prior to forming a weld body 184. In some examples, preheating achieves a temperature of 38°+/−3° C. (100°+/−5° F.) in the first and second members, at least adjacent the location for the weld. In various embodiments, method 500 includes maintain a welding heat input of the welding tool between 15 and 30 KJoule per inch of the weld pass of the while forming the weld between the first and second members. Other ranges of heat input are appropriate to form a weld between the first and second members.

Various embodiments of method 500 include performing a hardening process for the weld that joins the first and second members. The hardening process may be an age hardening process, for example. For some embodiments, the age hardening process includes heating the weld to an age hardening temperature substantially within the range of 482 to 621° Celsius (900 to 1150° F.), maintaining this temperature for a hold period, and air-cooling the weld after the hold period. An exemplary embodiment uses an age hardening temperature of 615° C. (1140° F.), a hold period of four hours, and cooling in open air. For some embodiments, the age hardening process is preceded by a solution annealing process to improve further the mechanical properties of the weld or surrounding metal. The solution anneal process includes heating the weld and surrounding metal to a temperature substantially within the range of 816 to 1093° C. (1500 to 2000° F.), followed by air-cooling. Modifications to the cooling process may be used for some embodiments, modifications such as changing the cooling fluid used or using passive or forced flow of the cooling fluid. For some embodiments, a solution anneal process includes heating the weld and surrounding metal to 927° C. (1,700° F.). For embodiments, such as those having first member that includes E630 steel, an age hardening process is performed after block 508.

Without being limited to a particular theory, after experiencing a heating process, precipitation hardened stainless steels, in general, benefit from a faster cooling rate than the cooling rate that is preferred for high-strength low alloy steel. A relatively fast cooling rate for precipitation hardened stainless steels is a cooling rate that inhibits or reduces the potential for precipitates in the heat-affected zone to go into solution after being exposed to an elevated temperature, such as a temperature of the welding process. In general, after completion of weld body 184, it is preferred to cool the weld 128 and the heat-affected zone of second member at a faster rate than the cooling that was achieved for the first member and the border layer, as discussed with respect to block 504.

For various embodiments in which the first and second members are tubular members, the plurality of passes of weld material are annular, extending circumferentially about the first or second tubular member. In some embodiments, method 500 includes joining the first and second members at a threaded joint prior to welding the plurality of passes of weld material. In some embodiments, the first or second member is a solid member. In a cross-section perpendicular to a longitudinal axis, the first or second member may be round, rectangular, or may be characterized by another shape.

In various embodiments, method 500 includes establishing a three-sided groove or trough between first and second members. The groove includes the border layer on the first member and the second joint surface on the second member, and welding a plurality of passes of weld material is performed within the trough. Various embodiments of method 500 may include fewer operations than described, and other embodiments of method 500 include additional operations based on other concepts presented in this specification, including the figures.

Additional Information

Referring again to FIG. 3 and FIG. 9 for contrast, in some embodiments prior to welding, a portion of a weld-participating end of an elongate tubular member (e.g. rotor member 126 or member 226) is received within a portion of a weld-participating end of a first tubular member, (e.g., a tubular fitting similar to member 124). Using terms previously described, rather than a portion the first weld-participating end of a first tubular member being inserted inside the second weld-participating end of a second tubular member, in some embodiments, a portion of the second weld-participating end is received inside a portion of the first weld-participating end. Similarly, instead of removing an inner portion of the first weld-participating end, as described with respect to FIG. 3 to transition to FIG. 1, in some embodiments, an inner portion of the second weld-participating end (e.g. an end of a rotor member) may be removed, and this removal of material may expose a weld to a passageway in a pair of welded tubular members, which may form, as an example, a rotor. This variation is also applicable to other embodiments, such as the fabricated member 220 of FIG. 9.

Although the welded joints and the welding methods described herein were primarily described in terms of joining pairs of tubular members together. The disclosed welded joints (e.g., welds 184, 248, 384, 484) and the welding methods may also be used to join first and second members having other shapes, such as flat materials (e.g., sheets or plates) and materials that include curvature but are not tubular. Any of these may be joined by welding members that overlap (e.g., In FIG. 3, neck 150 of members 124 is disposed inside channel 174 of rotor member 126.) or by forming a butt weld for members joined end-to-end without an overlap (e.g., FIG. 10). In some embodiments, using the materials describe above, as examples, an end of a rotor member is received within a fitting member prior to welding. In some of these, an inner bore or channel is later machined to achieve a larger or more uniform inner diameter.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. A method of welding to join a high-strength low alloy steel first member to a stainless steel second member, the method comprising:
    buttering a first joint surface on the b-strength low alloy steel first member, wherein buttering comprises:
        preheating the first joint surface;
        welding a border layer of weld material to the first joint surface; and
        heat treating the border layer and the first joint surface after welding the border layer; and
    forming a weld between the alloy steel first member and the stainless steel second member after heat treating the border layer and the first joint surface, the forming comprising:
        preheating the border layer and preheating a second joint surface on the stainless steel second member; and
        adding a body of weld material between the border layer and the second joint surface.

2. The method of claim 1 wherein adding a body of weld material comprises:
    welding a plurality of passes of weld material between the border layer and the second joint surface; and
    maintaining an interpass temperature of 177 degrees C. or less while welding the plurality of passes.

3. The method of claim 1 further comprising: maintain a welding heat input between 15 and 30 KJoule/inch while forming the weld between the first and second members.

4. The method of claim 1 further comprising: preheating the first and second members to 75+/−5 degrees F. prior to forming the weld between the first and second members.

5. The method of claim 1 wherein the second member is a precipitation-hardened (PH) stainless steel.

6. The method of claim 5 wherein the first member is tubular and the second member is tubular; and
    wherein the plurality of passes of weld material are annular.

7. The method of claim 6 further comprising:
    joining the first and second members at a threaded joint prior to welding the plurality of passes of weld material.

8. The method of claim 1 further comprising:
    overlapping the first and second members prior to welding the plurality of passes of weld material.

9. The method of claim 8 wherein forming a weld between the first and second members further comprises: establishing a three-sided trough between first and second members;
    wherein the trough includes the border layer on the first member and the second joint surface on the second member; and
    wherein welding the plurality of passes of weld material is performed within the trough.

10. The method of claim 8 wherein the first member is tubular having a first weld-participating end and the second member is tubular having a second weld-participating end;
    wherein a passageway extends through the first and second weld-participating ends;
    wherein overlapping the first and second members includes aligning the first and second members along a centerline and includes an action selected from the following group of actions:
        inserting a portion of the first weld-participating end inside a portion of the second weld-participating end; and
        inserting a portion of the second weld-participating end inside a portion of the first weld-participating end;
    wherein the method further comprises: removing an inner portion of the first weld-participating end or an inner portion of the second weld-participating end to expose the weld to the passageway.

11. The method of claim 1 further comprising:
    performing an age hardening process for the weld formed between the first and second members;
    wherein the age hardening process includes heating the weld to a temperature in the range of 482 to 621 degrees Celsius followed by air-cooling the weld.

* * * * *

UNITED STATES PATENT AND TRADEMARK OFFICE
CERTIFICATE OF CORRECTION

Page 1 of 1

PATENT NO. : 12,240,066 B2
APPLICATION NO. : 17/427568
DATED : March 4, 2025
INVENTOR(S) : William Randal Bunker, Helna George and Rajagopala N. Pillai It is certified that error appears in the above-identified patent and that said Letters Patent is hereby corrected as shown below:

In the Claims

Column 19, Claim 1, Line 37: reads "buttering a first joint surface on the b-strength low alloy" should read --buttering a first joint surface on the high-strength low alloy--

Column 19, Claim 1, Line 44: reads "forming a weld between the alloy steel first member and" should read --forming a weld between the high-strength low alloy steel first member and--

Signed and Sealed this
Twenty-second Day of April, 2025

Coke Morgan Stewart
*Acting Director of the United States Patent and Trademark Office*